Nov. 17, 1970 T. A. JOHANSSON 3,540,324
ROTARY CUTTING TOOL
Filed June 16, 1967 2 Sheets-Sheet 1
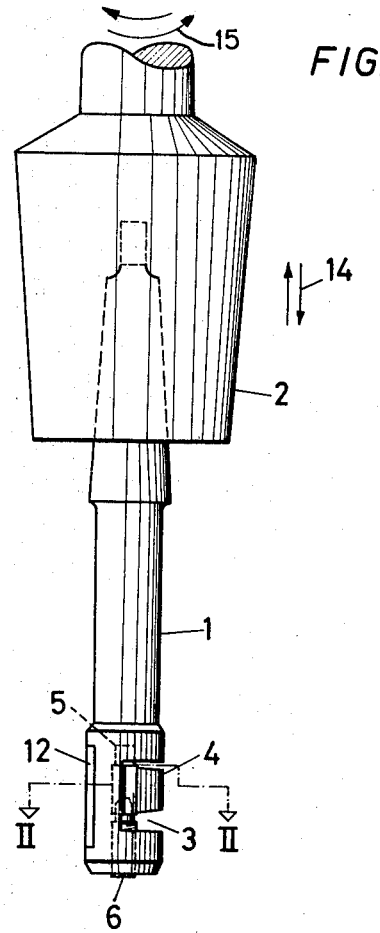
FIG. 1
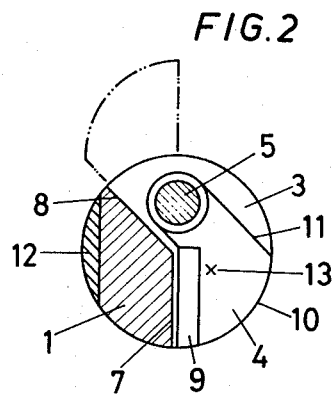
FIG. 2
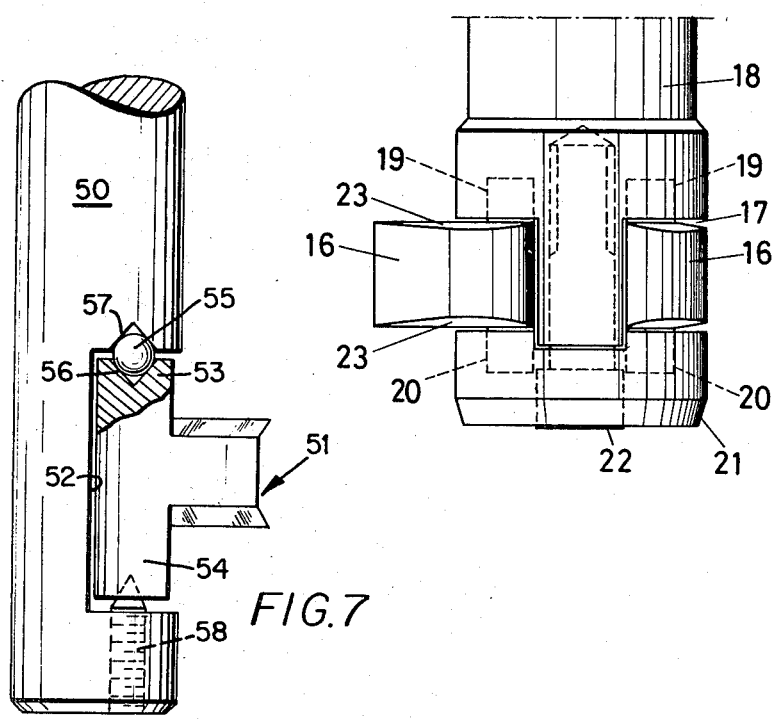
FIG. 3
FIG. 7

Nov. 17, 1970  T. A. JOHANSSON  3,540,324
ROTARY CUTTING TOOL

Filed June 16, 1967  2 Sheets-Sheet 2

3,540,324
ROTARY CUTTING TOOL

Ture Axel Johansson, Inagogatan 12,
Goteborg H, Sweden
Continuation-in-part of application Ser. No. 502,089,
Oct. 22, 1965. This application June 16, 1967,
Ser. No. 646,634
Claims priority, application Sweden, May 12, 1965,
3,225/65; Oct. 15, 1965, 13,362/65
The portion of the term of the patent subsequent to
Mar. 12, 1985, has been disclaimed
Int. Cl. B23b 51/10
U.S. Cl. 77—73.5          7 Claims

ABSTRACT OF THE DISCLOSURE

A rotary cutting tool in which a spindle adapted to be connected to a chuck or tool holder of a machine is so designed that its direction of rotation may be reversed. The spindle has associated therewith at least one cutter having a radial cutting edge and which is swingable about an axial pivot located in a recess in the spindle whereby the cutter may be completely retracted within the outer surface of the spindle. The center of gravity of the cutter will, in the retracted position, be located in a position eccentric in relation to the axis of rotation so that the cutter will be automatically swung outwardly upon spindle rotation. The spindle at its upper and lower radial edges is additionally provided with contact surfaces for co-operation with the work piece so that the cutter is forced into the recess when the cutter rotates in a backward direction.

---

This application is a continuation-in-part of my co-pending application Ser. No. 502,089 filed Oct. 22, 1965 and now Pat. No. 3,372,610 issued March 12, 1968.

The present invention relates to a rotary cutting tool, and more specifically to a tool for counter-sinking the back side of a through-bore in a workpiece.

An object of the invention is to provide a tool of such type which is inexpensive to manufacture, very simple to use, and capable of quick operation thereof.

Cutting tools having swingable cutters are known in the art, but these prior tools rely to a large extent on springs to retract the cutters into the body of the tools. Such arrangement makes assembly difficult, and the cutters are unsatisfactorily supported in the body. A simple and reliable way of mounting the cutter pre-supposes arranging the cutter in such a way that its center of gravity in the inward or "swung in" position is eccentric relative to the axis of the rotation of the spindle. The cutter will then be swung outwardly regardless of the direction of rotation of the spindle.

More particularly, according to the present invention the cutter at each radial edge is provided with a contact surface for cooperation with the work piece and when the spindle is rotated "backwards" or contrary to the normal working direction and is caused to enter slowly a bore, the cutter is immediately swung outwardly. When the contact surface at the downward end of the cutter comes into contact with the workpiece, the friction at the contact surface will drag the cutter inwardly until it is totally retracted so that the spindle can be pushed through the bore. As soon as the cutter is again free, it swings outwardly and remains in such position even when the direction of rotation is reversed to a "working direction." When the tool is to be withdrawn, the direction of rotation is again reversed, and when the upper contact surface of the cutter during the withdrawal comes into contact with the workpiece, the cutter is swung inwardly. The contact surface may be the cutting edge per se, or a surface axially separated therefrom.

Figure 4:
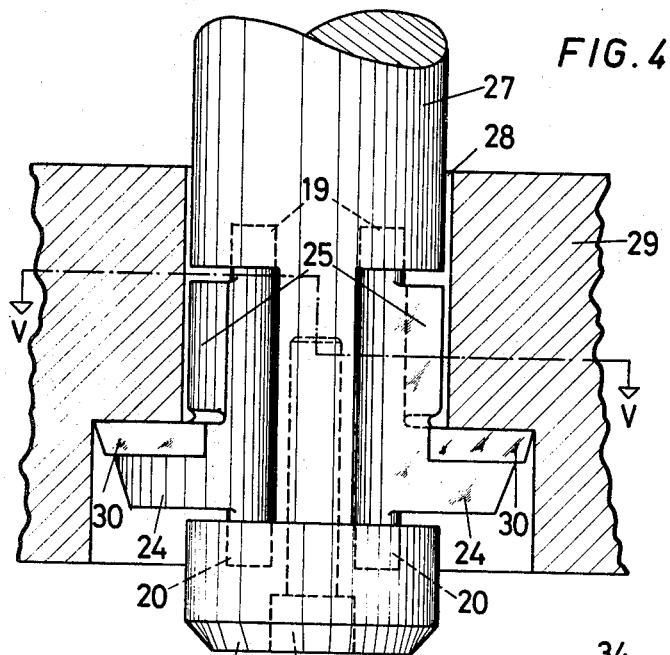
Figure 5:
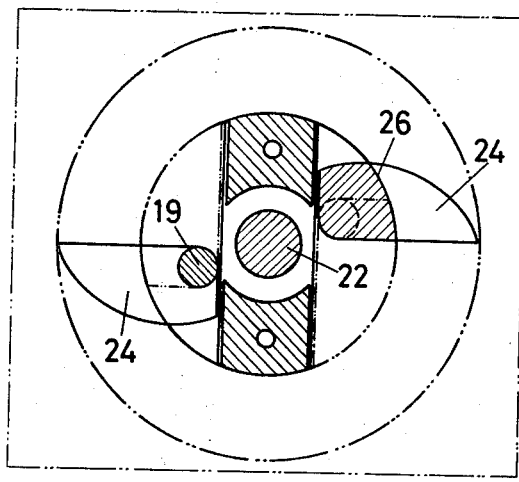
Figure 6:
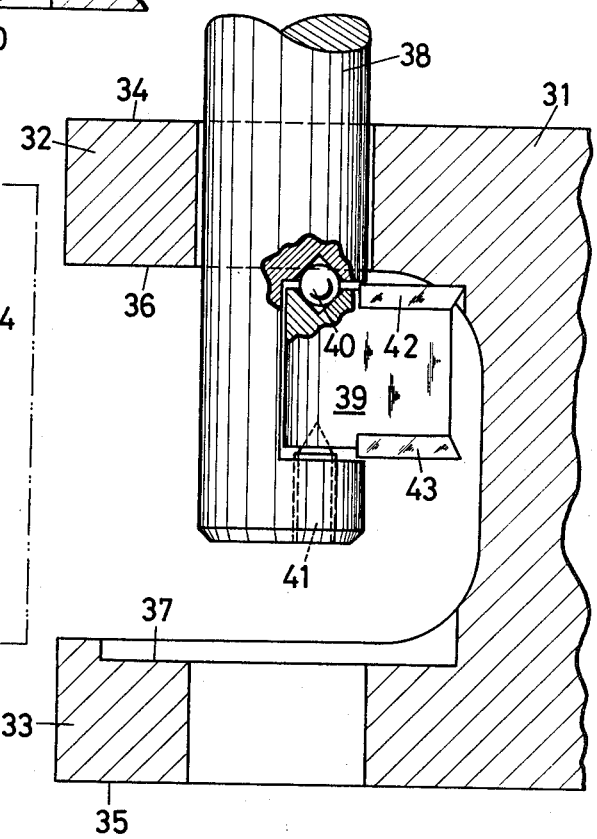

Further important and additional objects of the invention will become more readily apparent to persons skilled in the art from the ensuing description and annexed drawings, and in which drawings:

FIG. 1 is a view in elevation of a cutting tool according to the invention mounted in a tool holder and provided with a single cutter, FIG. 2 is a view taken along line II—II of FIG. 1, the view looking in the direction of the arrows, FIG. 3 is a fragmentary view showing the lower part of a tool provided with two cutters, FIG. 4 is a fragmentary view partly in elevation and partly in cross-section of a modified embodiment of a two-cutter-tool inserted in a workpiece, FIG. 5 is a view taken along line V—V of FIG. 4, the view looking in the direction of the arrows, FIG. 6 is a fragmentary view partly in elevation and partly in cross-section of a modified embodiment of a single-cutter tool, and FIG. 7 is a fragmentary view partly in elevation and partly in cross-section of a further embodiment of the invention.

The tool illustrated in FIGS. 1 and 2 comprises a spindle 1, which in a known manner is provided with an upper conical end portion, and by which the tool can be attached to a chuck 2 of a drilling machine or the like. The lower part of the spindle is provided with a recess 3 in which a cutter 4 having less axial length than the recess 3 is arranged. The upper end portion of the cutter 4, i.e. the end portion in proximity to the conical end of the spindle 1, is provided with an integral pivot member 5 which is journalled into a bore provided in the spindle. The opposite end portion of the cutter 4 is formed with a bore which is concentric to the pivot member 5 and into which one end of a pin 6 extends. The pin is screw-threaded along a portion of its length and such portion is arranged in a correspondingly screw-threaded bore in the lower part of the spindle 1. The pivot member 5 is of somewhat lesser length than the difference in axial length between the recess 3 and the cutter 4 so that when removing the pin 6 and moving the cutter 3 downwardly, the pivot member 5 can be removed from its corresponding bore and the cutter withdrawn.

The recess 3 occupies more than one half of the cross section of the spindle and the axial side wall of the recess comprises two parts 7 and 8 arranged at an angle to each other, as illustrated in FIG. 2. The cutter is, at its upper radial edge, i.e. the edge turned towards the tool holder, provided with an insert of carbide steel 9 which acts as a cutting edge. When the cutter 4 is in its inner position as shown by the full lines in FIG. 2, the edge 9 lies parallel to the side wall part 7 of the recess.

The cutter is further provided with an outward surface 10 which in the inner or "swung-in" position coincides with the outer surface of the spindle and a back surface 11 which in the outward or "swung-out" position illustrated in the dash and dot lines rests against the side wall part 8 of the recess for supporting the cutter in the working position.

The pivot defined by the pivot member 5 and pin 6 of the cutter is parallel to the axis of rotation and is arranged at one end of the cutter. This is designed in such a manner that its center of gravity indicated at 13 in the "swung-in" position will be eccentrically located in relation to the axis of rotation of the spindle 1.

The tool holder 2 is, as is customary with machines of this type, axially displaceable, and the direction of rotation may be reversed. The direction of these movements are indicated by arrows at 14 and 15, respectively.

When a tool is to be used for the counter-sinking of the back side of a through-bore in a workpiece, such as the back side of a pipe flange, the appropriate tool will have a diameter essentially corresponding to the diameter of the bore. The chuck 2 is rotated "backwards" in relation to the normal working direction and the spindle is moved towards the bore. The cutter is swung outwardly by centrifugal action, but as soon as the lower radial edge of the cutter comes into contact with the workpiece, the friction between the two parts drags the cutter back into the recess 3. To facilitate this movement, the contact surface of the cutter may, as clearly shown in FIG. 3, be slightly bevelled. When the cutter has passed through the bore, the cutter again swings outwardly, and when the direction of rotation is reversed, the cutter remains in the "swung-out" position ready for work. Thereafter, the cutter can be brought into working contact with the back side of the workpiece. When the counter-sinking operation is finished, the direction of rotation is again reversed, and when the tool is retracted, the cutter 4 is swung into the recess 3, due to the friction between the upper radial edge and the workpiece. In this situation, the cutting edge also acts as contact surface, and there is nothing to prevent the cutter from being "folded" inwardly, until the cutter edge 9 meets the side wall 8 of the recess.

The tool illustrated in FIGS. 1 and 2 is for comparatively small tool diameters, and due to the limited space only one cutter is used. This, however, has no detrimental influence on the cutting operation, because the lower portion of the spindle is governed by the bore in the workpiece during the operation. To minimize the wear of such portion of the spindle, which is enhanced by the reaction force from the cutting operation pushing the back portion of the spindle against the interior surface of the bore, the spindle 1 is provided with an insert 12 of hard carbide steel at its back side remote from the cutter 4.

With reference to the embodiment illustrated in FIG. 3, and which is for larger diameter holes, the tool is provided with two identical cutters 16. The cutters 16 are mounted in separate recesses 17 in the lower part of a spindle 18. Each cutter is provided with two integral pivots 19, 20 extending from the radial sides of the cutter, respectively. The upper pivots 19 are journalled in correspondingly shaped bores in the lower part of the spindle 18 while the lower pivots 20 are journalled in correspondingly shaped bores in a fitting plate 21. The fitting plate is rigidly connected to the spindle by means of a screw 22. The cutters 16 at their upper and lower radial sides are provided with cutting edges, and as the cutters are identical, they may be exchanged for each other, thereby lessening the stopping time for regrinding, et cetera. The cutting edges act as contact surfaces for the retraction, and their upper and lower edges may be beveled as indicated at 23 to facilitate the cooperation with the workpiece.

In FIG. 3, the cutters 16 are swingable 90° about the pivots 19, 20 and the cutter 16 shown at the right hand side of the figure is retracted within the circumferential surface of the spindle 18. The cutter 16 shown at the left hand side is swung 90° outwardly and in which position the cutter projects outside of the spindle. Since the cutters 16 in this tool are disposed diametrically opposite to each other, there is no load imbalance. No special step to increase the wear resistance of the spindle is therefore necessary.

In the embodiment shown in FIGS. 4 and 5, each cutter 24 is provided with an axially extending neck portion 25 which is formed with an arcuate surface 26, which in the "swung-out" position coincides with the circumferential surface of a spindle 27. The neck portion 25 is of such axial length that the cutter 24 is prevented from being swung back to its inactive position when the portion 25 is moved into a bore 28 of a workpiece 29. The cutters at their upper radial edges are provided with hard carbide steel inserts 30 which constitute a contact surface for moving the cutter to the inactive position is located on the upper radial edge of the neck portion 25. The inserts execute the actual cutting operation.

The cutters 24 are, as in the FIG. 3 embodiment, provided with integral pivots 19 and 20 and are attached to the spindle 27 by means of a fitting plate 21 and screw 22. The lower radial edges of cutters per se act as contact surfaces during the retraction, when the spindle is pushed into the bore 28.

Before the cutters may swing outwardly at the underside of the bore, the spindle 27 must be pushed sufficiently downwardly into the bore to cause the upper radial edge of the neck portions to be free of the bore.

In FIG. 6 is disclosed a modified embodiment of a single cutter tool adapted for special performance. A workpiece 31 is provided with two flanges 32 and 33, respectively, and to which flanges other parts are to be connected by bolts. The flanges usually merge into the main body along a rounded surface which prevents the formation of a plane surface for the head of the bolts. Outer surfaces 34, 35 of the flanges may easily be machined in a conventional manner, but inner surfaces 36, 37 present certain difficulties.

With the present tool, these surfaces may be machined consecutively. The tool is essentially of the same type as that illustrated and includes a spindle 38 having a cutter 39 swingably mounted in a recess in the spindle. In lieu of the fixed upper pivot, the cutter is provided with a recess for cooperation with a ball 40 which is lodged in a recesess provided in the spindle. The cutter is locked in the recess by means of a screw 41. The advantage of this design, compared to that disclosed in FIG. 1, is that the axial dimension of the recess may be shortened.

The cutter is provided with hard carbide steel inserts 42, 43 at its upper and lower radial edges, respectively, and with this tool it is possible to machine the internal surfaces 36, 37 of the flanges 32, 33 without changing the position of the workpiece.

With reference to FIG. 7 there is disclosed a modified embodiment of the tool in which a spindle 50 is provided with a cutter 51 swingably positioned in a recess 52 in the spindle. The cutter includes axially extending neck portions 53 and 54 at the upper and lower ends thereof. A ball 55 is positioned in a recess 56 in the neck portion 53 and a recess 57 in the spindle 50. The cutter 51 is locked in the recess 52 by a screw 58 which engages the neck portion 54.

While the invention has been described with reference to particular embodiments, it will be appreciated by persons skilled in the art that changes and modifications of the invention can be effected and equivalents substituted therefor without departing from the spirit and scope of the appended claims.

What I claim is:

1. A rotary cutting tool having at least one radial cutting edge for working the back side of a through bore in a workpiece, comprising a spindle capable of rotation in opposite directions, said spindle having opposite ends, one of the ends being capable of attachment to an axially displaceable tool holder of a machine in which the direction of rotation can be reversed, the spindle in proximity to the other end having at least one transverse recess, a pivot located in the recess parallel to the axis of rotation of the spindle, a cutter freely swingable about the pivot, with the cutter being capable of total retraction within the circumference of the spindle so that the center of gravity of the cutter is eccentrically located in relation to the axis of rotation whereby the cutter can swing outwardly from the retracted position regardless of the direction of rotation of the spindle, an axially directed back face for the cutter adapted to rest against a side wall of the recess in the outwardly swung position of the cutter, and bevelled contact surfaces on the lower and upper edges, respectively, of the cutter for contacting the faces of the workpiece surrounding the bore during insertion of the tool into the bore and during removal therefrom, respectively while rotating the tool in the reverse direction.

2. A rotary cutting tool having at least one radial cutting edge particularly for working the back side of a through bore in a workpiece, comprising a spindle having opposite ends, one of the ends being capable of attachment to an axially displaceable tool holder of a machine in which the direction of rotation can be reversed, the spindle in proximity to the other end having at least one transverse recess, a pivot located in the recess parallel to the axis of rotation of the spindle, a cutter swingable about the pivot, with the cutter being capable of total retraction within the circumference of the spindle so that the center of gravity of the cutter is eccentrically located in relation to the axis of rotation whereby the cuter can swing outwardly from the retracted position regardless of the direction of rotation of the spindle, an axially directed back face for the cutter adapted to rest against a side wall of the recess in the outwardly swung position of the cutter, and contact surfaces on the upper and lower radial edges, respectively, of the cutter for cooperation with the workpiece, said cutter being provided with an axially extending neck portion, the radial end surface of which constitutes one of said contact surfaces, said neck portion having an arcuate surface which, when the cutter is in the outwardly swung position, is concentric with and defines an extension of the outer surface of the spindle, and is so located in relation to the pivot for the cutter as to prevent the cutter from being swung inwardly when the cutter is in working position.

3. The rotary cutting tool as claimed in claim 2, in which the cutter is provided with an axially extending neck portion at both ends thereof.

4. A rotary cutting tool having at least one radial cutting edge particularly for working the back side of a through bore in a workpiece, comprising a spindle having opposite ends, one of the ends being capable of attachment to an axially displaceable tool holder of a machine in which the direction of rotation can be reversed, the spindle in proximity to the other end having at least one transverse recess, a pivot located in the recess parallel to the axis of rotation of the spindle, a cutter swingable about the pivot, with the cutter being capable of total retraction within the circumference of the spindle so that the center of gravity of the cutter is eccentrically located in relation to the axis of rotation whereby the cutter can swing outwardly from the retracted position regardless of the direction of rotation of the spindle, an axially directed back face for the cutter adapted to rest against a side wall of the recess in the outwardly swung position of the cutter, and contact surfaces on the upper and lower radial edges, respectively, of the cutter for cooperation with the workpiece, the pivot including a lower part, the lower end surface of the recess being provided in a separate body fitted to the spindle, and said body having an axially directed bore for receiving the corresponding end of the lower part of the pivot for the cutter.

5. The rotary cutting tool as claimed in claim 4, in which the lower part of the pivot is integral with the cutter.

6. The rotary cutting tool as claimed in claim 5, including at least two identical cutters arranged in correspondingly shaped recesses and each cutter being provided with upper and lower radial working edges.

7. A rotary cutting tool having at least one radial cutting edge particularly for working the back side of a through bore in a workpiece, comprising a spindle having opposite ends, one of the ends being capable of attachment to an axially displaceable tool holder of a machine in which the direction of rotation can be reversed, the spindle in proximity to the other end having at least one transverse recess, a pivot located in the recess parallel to the axis of rotation of the spindle, a cutter swingable about the pivot, with the cutter being capable of total retraction within the circumference of the spindle so that the center of gravity of the cutter is eccentrically located in relation to the axis of rotation whereby the cutter can swing outwardly from the retracted position regardless of the direction of rotation of the spindle, an axially directed back face for the cutter adapted to rest against a side wall of the recess in the outwardly swung position of the cutter, and contact surfaces on the upper and lower radial edges, respectively, of the cutter for cooperation with the workpiece, the pivot including an upper part defined by a ball mounted in juxtaposed recesses in the upper end walls of the recess and the cutter, respectively, and a lower part defined by a pin inserted from the bottom of the spindle.

References Cited
UNITED STATES PATENTS

| | | | |
|---|---|---|---|
| 3,372,610 | 3/1968 | Johansson | 77—73.5 XR |
| 2,879,038 | 3/1959 | Johnson | 77—58 XR |
| 3,200,673 | 8/1955 | Pfeifer | 77—58 |

FRANCIS S. HUSAR, Primary Examiner

U.S. Cl. X.R.

77—58